(12) United States Patent
Al-Haj Ali et al.

(10) Patent No.: US 11,111,324 B2
(45) Date of Patent: Sep. 7, 2021

(54) METHOD FOR WITHDRAWING AGGLOMERATES FROM A FLUIDIZED BED POLYMERIZATION REACTOR

(71) Applicant: BOREALIS AG, Vienna (AT)

(72) Inventors: Mohammad Al-Haj Ali, Helsinki (FI);
Vasileios Kanellopoulos, Linz (AT);
Apostólos Krallis, Espoo (FI); Klaus Nyfors, Porvoo (FI); Pablo Ivan Aguayo Arellano, Pasching (AT);
Gunter Weickert, Ahaus (DE);
Eric-Jan Prinsen, Aadorp (NL)

(73) Assignee: Borealis AG, Vienna (AT)

( * ) Notice: Subject to any disclaimer, the term of this patent is extended or adjusted under 35 U.S.C. 154(b) by 634 days.

(21) Appl. No.: 16/065,597

(22) PCT Filed: Dec. 15, 2016

(86) PCT No.: PCT/EP2016/081280
§ 371 (c)(1),
(2) Date: Jun. 22, 2018

(87) PCT Pub. No.: WO2017/108586
PCT Pub. Date: Jun. 29, 2017

(65) Prior Publication Data
US 2020/0369806 A1 Nov. 26, 2020

(30) Foreign Application Priority Data
Dec. 22, 2015 (EP) ..................................... 15201812

(51) Int. Cl.
*C08F 210/16* (2006.01)
*C08F 2/34* (2006.01)
(Continued)

(52) U.S. Cl.
CPC ........... *C08F 210/16* (2013.01); *B01J 8/0035* (2013.01); *B01J 8/1809* (2013.01); *B01J 8/1827* (2013.01);
(Continued)

(58) Field of Classification Search
USPC ................... 526/88, 918, 920; 422/110, 145
See application file for complete search history.

(56) References Cited

U.S. PATENT DOCUMENTS

| 3,324,093 A | 6/1967 | Alleman |
| 3,405,109 A | 10/1968 | Rohlfing |

(Continued)

FOREIGN PATENT DOCUMENTS

| EP | 0045976 A2 | 2/1982 |
| EP | 0045977 A2 | 2/1982 |

(Continued)

OTHER PUBLICATIONS

Notification of Transmittal of the International Search Report and the Written Opinion of the International Searching Authority issued in International Application No. PCT/EP2016/081280, dated Mar. 21, 2017.

*Primary Examiner* — Fred M Teskin
(74) *Attorney, Agent, or Firm* — Ditthavong, Steiner & Mlotkowski

(57) ABSTRACT

The present invention relates to a process and apparatus for withdrawing polymer agglomerates from a fluidised bed polymerisation reactor, the polymerisation reactor comprising a bottom zone having a generally conical shape and no fluidisation grid. The agglomerates are withdrawn by using an agglomerate trap below the bottom zone. A value of a process variable indicative of the content of agglomerates in the agglomerate trap is measured and the opening time of the (Continued)

valves transferring polymer to and from the agglomerate trap is adjusted based on the measured value.

13 Claims, 3 Drawing Sheets

(51) Int. Cl.
*B01J 8/00* (2006.01)
*B01J 8/18* (2006.01)
*B01J 8/24* (2006.01)

(52) U.S. Cl.
CPC .............. *B01J 2208/00061* (2013.01); *B01J 2208/00681* (2013.01); *B01J 2208/00761* (2013.01); *B01J 2208/00769* (2013.01)

(56) References Cited

U.S. PATENT DOCUMENTS

| | | | |
|---|---|---|---|
| 4,107,414 A | | 8/1978 | Giannini et al. |
| 4,186,107 A | | 1/1980 | Wagner |
| 4,226,963 A | | 10/1980 | Giannini et al. |
| 4,347,160 A | | 8/1982 | Epstein et al. |
| 4,382,019 A | | 5/1983 | Greco |
| 4,435,550 A | | 3/1984 | Veno et al. |
| 4,465,782 A | | 8/1984 | McKenzie |
| 4,472,524 A | | 9/1984 | Albizzati |
| 4,473,660 A | | 9/1984 | Albizzati et al. |
| 4,522,930 A | | 6/1985 | Albizzati et al. |
| 4,530,912 A | | 7/1985 | Pullukat et al. |
| 4,532,313 A | | 7/1985 | Matlack |
| 4,560,671 A | | 12/1985 | Gross et al. |
| 4,581,342 A | | 4/1986 | Johnson et al. |
| 4,582,816 A | | 4/1986 | Miro |
| 4,621,952 A | | 11/1986 | Aronson |
| 4,657,882 A | | 4/1987 | Karayannis et al. |
| 5,391,654 A | | 2/1995 | Ahvenainen et al. |
| 7,812,102 B2 * | | 10/2010 | Kivela ............... B01J 8/24 526/72 |
| 2010/0056734 A1 * | | 3/2010 | Karer ............... B01J 8/1827 526/64 |

FOREIGN PATENT DOCUMENTS

| | | |
|---|---|---|
| EP | 0047077 A1 | 3/1982 |
| EP | 0188125 A2 | 7/1986 |
| EP | 0250169 A2 | 12/1987 |
| EP | 0372239 A2 | 6/1990 |
| EP | 0479186 A2 | 4/1992 |
| EP | 0579426 A1 | 1/1994 |
| EP | 0683176 A1 | 11/1995 |
| EP | 0688794 A1 | 12/1995 |
| EP | 0810235 A2 | 12/1997 |
| EP | 0887380 A1 | 12/1998 |
| EP | 1415999 A1 | 5/2004 |
| EP | 1538167 A1 | 6/2005 |
| EP | 1600276 A1 | 11/2005 |
| EP | 1739103 A1 | 1/2007 |
| EP | 1752462 A1 | 2/2007 |
| EP | 1860125 A1 | 11/2007 |
| EP | 2330135 A1 | 6/2011 |
| EP | 2495038 A1 | 9/2012 |
| EP | 2594433 A1 | 5/2013 |
| GB | 1272778 A | 5/1972 |
| GB | 1580635 A | 12/1980 |
| WO | 9212182 A1 | 7/1992 |
| WO | 9512622 A1 | 5/1995 |
| WO | 9632423 A1 | 10/1995 |
| WO | 9532994 A1 | 12/1995 |
| WO | 9618662 A1 | 6/1996 |
| WO | 9728170 A1 | 8/1997 |
| WO | 9832776 A1 | 7/1998 |
| WO | 9858976 A1 | 12/1998 |
| WO | 9858977 A1 | 12/1998 |
| WO | 9951646 A1 | 10/1999 |
| WO | 9961489 A1 | 12/1999 |
| WO | 0029452 A1 | 5/2000 |
| WO | 0155230 A1 | 8/2001 |
| WO | 02088194 A1 | 11/2002 |
| WO | 03010208 A1 | 2/2003 |
| WO | 03051514 A1 | 6/2003 |
| WO | 03051934 A2 | 6/2003 |
| WO | 01306510 A1 | 12/2003 |
| WO | 2004085499 A2 | 10/2004 |
| WO | 2005118655 A1 | 12/2005 |
| WO | 2011026876 A1 | 3/2011 |

* cited by examiner

PRIOR ART

METHOD FOR WITHDRAWING AGGLOMERATES FROM A FLUIDIZED BED POLYMERIZATION REACTOR

FIELD OF THE INVENTION

The present invention is directed to the polymerization of olefins in a fluidized bed reactor. More specifically, the present invention is directed to the polymerization of olefins in a vertical fluidized bed reactor having no fluidization grid. In particular, the present invention is directed to withdrawing polymer agglomerates from the vertical fluidized bed reactor having no fluidization grid.

PRIOR ART AND PROBLEM TO BE SOLVED

EP-A-2495038 discloses a process where olefins are polymerized in a fluidized bed reactor where the reactor does not contain a gas distribution plate. The document teaches that the agglomerates can be withdrawn from the bottom part of the reactor through outlet (12) after reactor shut-down.

There is still a need in the art to withdraw polymer agglomerates from a fluidized bed polymerisation reactor during the polymerisation process

SUMMARY OF THE INVENTION

As viewed from one aspect, the present invention provides a method for withdrawing polymer agglomerates from a fluidised bed polymerisation reactor, the polymerisation reactor comprising a middle zone having a generally cylindrical shape, a bottom zone having a generally conical shape in direct contact with and below the middle zone and wherein a base of a fluidised bed is formed, and an agglomerate trap below the bottom zone, the agglomerate trap having a body, a first connection comprising a first valve connecting the body to the bottom zone and a second connection comprising a second valve connecting the body to agglomerate recovery system and wherein the reactor does not comprise a fluidisation grid, the method comprising the steps of measuring a value of a process variable indicative of the content of agglomerates in the agglomerate trap; and adjusting the opening time of the first valve or the second valve or both the first valve and the second valve based on the measured value.

As viewed from another aspect, the present invention provides a system for withdrawing polymer agglomerates from a fluidised bed polymerisation reactor, the system comprising: (A) a polymerisation reactor comprising (A-1) a middle zone having a generally cylindrical shape, (A-2) a bottom zone having a generally conical shape in direct contact with and below the middle zone and wherein a base of a fluidised bed is formed, and (A-3) an agglomerate trap below the bottom zone, the agglomerate trap having a body, a first connection comprising a first valve connecting the body to the bottom zone and a second connection comprising a second valve connecting the body to agglomerate recovery system and wherein (A-4) the reactor does not comprise a fluidisation grid; (B) a sequence controller for controlling the sequence of opening and closing the first valve and the second valve; (C) means for determining the content of agglomerates in the body of the agglomerate trap and generating a signal proportional to the content of the agglomerates in the body of the agglomerate trap; and (D) a master controller for giving a set point to the sequence controller based on the signal proportional to the content of the agglomerates.

DETAILED DESCRIPTION

Definitions

Figure 1:
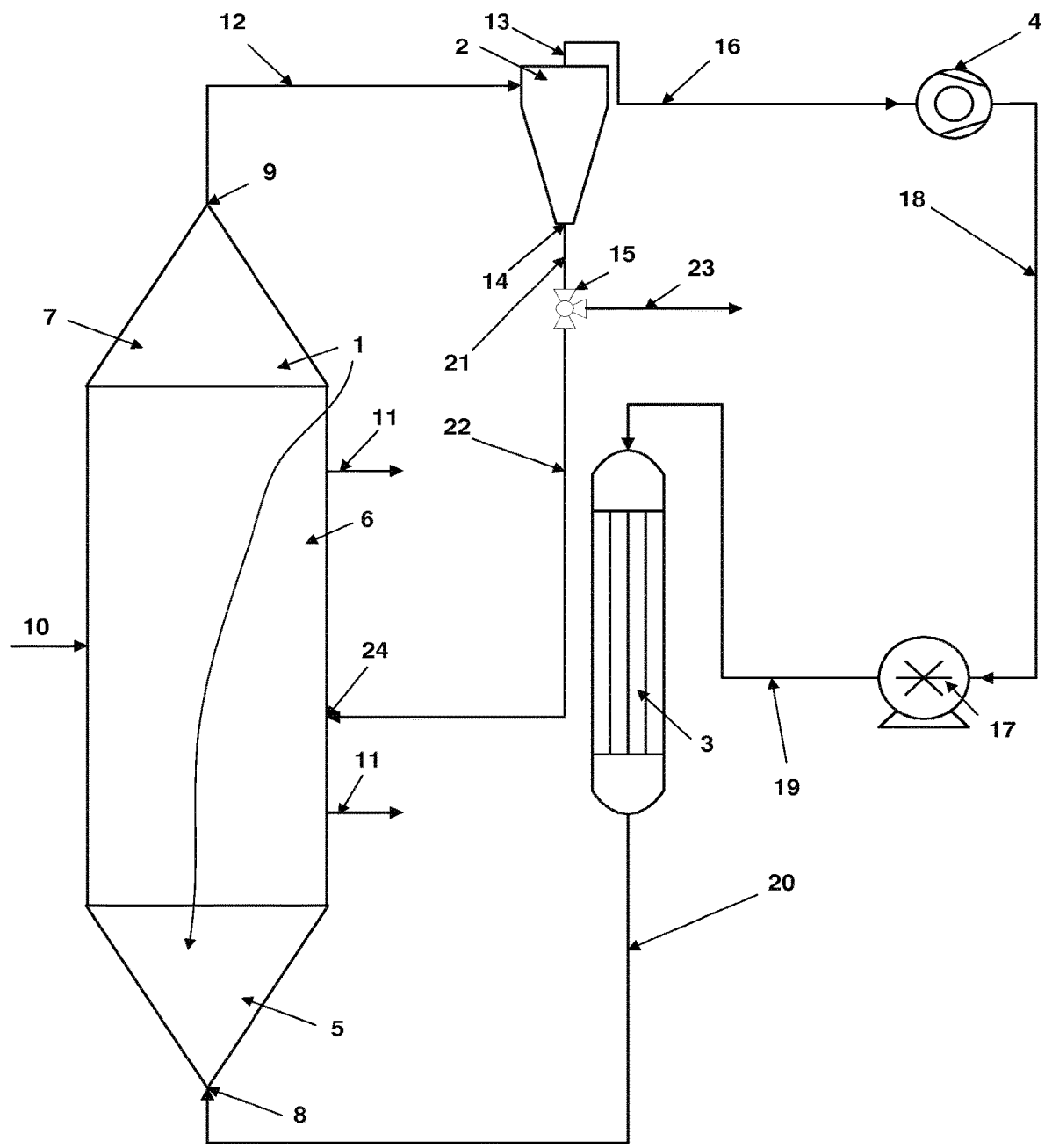
FIG. 1 is a simplified process diagram illustrating the process according to the prior art.

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

As it is well understood in the art the superficial gas velocity denotes the velocity of the gas in an empty construction. Thus, the superficial gas velocity within the middle zone is the volumetric flow rate of the gas (in $m^3/s$) divided by the cross-sectional area of the middle zone (in $m^2$) and the area occupied by the particles is thus neglected.

The olefins polymerized in the process of the present invention are typically alpha-olefins having from 2 to 10 carbon atoms. Preferably the olefins are ethylene or propylene, optionally together with one or more other alpha-olefins having from 2 to 8 carbon atoms. Especially preferably the process of the present invention is used for polymerizing ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

Unless specifically otherwise defined, the percentage numbers used in the text refer to percentage by weight.

Catalyst

The polymerisation is conducted in the presence of an olefin polymerisation catalyst. The catalyst may be any catalyst which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has median particle size from 6 to 90 µm, preferably from 6 to 70 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerization Stapes

The polymerization in the fluidized bed may be preceded by prior polymerization stages, such as prepolymerization or another polymerization stage conducted in slurry or gas phase. Such polymerization stages, if present, can be conducted according to the procedures well known in the art. Suitable processes including polymerization and other process stages which could precede the polymerization process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerization stages.

Gas Phase Polymerization

In the gas phase polymerization reactor the polymerization takes place in a fluidized bed formed by the growing polymer particles in an upwards moving gas stream. In the fluidized bed the polymer particles, containing the active catalyst, come into contact with the reaction gases, such as monomer, comonomer(s) and hydrogen which cause polymer to be produced onto the particles.

The polymerization takes place in a reactor including a bottom zone, a middle zone and a top zone. The bottom zone forms the lower part of the reactor in which the base of the fluidized bed is formed. The base of the bed forms in the bottom zone with no fluidization grid, or gas distribution plate, being present. Above the bottom zone and in direct contact with it is the middle zone. The middle zone and the upper part of the bottom zone contain the fluidized bed. Because there is no fluidization grid there is a free exchange of gas and particles between the different regions within the bottom zone and between the bottom zone and the middle zone. Finally, above the middle zone and in direct contact therewith is the top zone.

The upwards moving gas stream is established by withdrawing a fluidization gas stream from the top zone of the reactor, typically at the highest location. The gas stream withdrawn from the reactor is then compressed and cooled and re-introduced to the bottom zone of the reactor. Preferably, the gas is filtered before being passed to the compressor. Additional monomer, eventual comonomer(s), hydrogen and inert gas are suitably introduced into the circulation gas line. It is preferred to analyse the composition of the circulation gas, for instance, by using on-line gas chromatography and adjust the addition of the gas components so that their contents are maintained at desired levels.

The circulation gas line preferably comprises at least one cyclone. The cyclone has the objective of removing the entrained polymer from the circulation gas. The polymer stream recovered from the cyclone can be directed to another polymerization stage, or it may be returned into the fluidized bed reactor or it may be withdrawn as the polymer product.

The bottom zone of the reactor has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidized bed starts to form. When the gas velocity becomes still smaller the bed becomes denser and the polymer particles distribute the gas over the whole cross-section of the bed.

Preferably, the equivalent cross-sectional diameter of the bottom zone is monotonically increasing with respect to the flow direction of the fluidization gas through the fluidized bed reactor. As the flow direction of the fluidization gas is upwards with respect to the base, the equivalent cross-sectional diameter of the bottom zone is vertically monotonically increasing.

The bottom zone preferentially has straight circular cone shape. More preferably, the cone-angle of the cone-shaped bottom zone is 5° to 30°, even more preferably 7° to 25° and most preferably 9° to 18°, whereby the cone-angle is the angle between the axis of the cone and the lateral surface. It is not necessary in this preferred embodiment, however, that the bottom zone has the shape of a perfect cone but it may also have a shape of a truncated cone.

The bottom zone may also be seen as being constructed of a plurality of conical sections having different cone-angles. In such a case it is preferred that at least the conical section where the base of the fluidized bed is formed has the cone-angle within the above-specified limits. In a most preferred embodiment all the conical sections forming the bottom zone have the cone-angles within the above-specified limits. If the bottom zone comprises multiple conical sections it is then preferred that the steeper sections with a narrower cone angle are located at the lower end of the bottom zone and the sections with a wider cone angle are located at the higher end of the bottom zone. Such arrangement is believed to increase the shear forces at the wall of the reactor thus helping to prevent the polymer from adhering to the walls.

It is further preferred that the equivalent diameter of the bottom zone increases from about 0.1 to about 1 metres per one metre of height of the bottom zone (m/m). More preferably, the diameter increases from 0.15 to 0.8 m/m and in particular from 0.2 to 0.6 m/m.

The preferred cone-angles lead to additional improved fluidization behaviour and avoid the formation of stagnant zones. As a result, the polymer quality and stability of the process are improved. Especially, a too wide cone-angle leads to an uneven fluidization and poor distribution of the gas within the bed. While an extremely narrow angle has no detrimental effect on the fluidization behaviour it anyway leads to a higher bottom zone than necessary and is thus not economically feasible.

It is possible that there is an at least one additional zone being located below the bottom zone. It is preferred that the at least one additional zone, or if there is more than one additional zone, the total of the additional zones contributes/contribute to a maximum of 15% to the total height of the reactor, more preferably 10% to the total height of the reactor and most preferably less than 5% of the total height of the reactor. A typical example for an additional zone is a gas entry zone.

The fluidized bed reactor of the present invention comprises no gas distribution grid and/or plate. The even distribution of the fluidization gas within the bed is achieved by the shape of the bottom zone. The omission of the gas distribution grid reduces the number of locations where fouling and chunk formation can start. The terms gas distribution grid or gas distribution plate or fluidization grid are used synonymously to denote a metal plate or a construction within the reactor which has a purpose of distributing the fluidization gas evenly throughout the cross-sectional area of the reactor. In the reactors where a gas distribution grid is used it generally forms the base of the fluidized bed.

The middle zone of the fluidized bed reactor has a generally cylindrical shape. Preferably it will be in the form of a straight circular cylinder being denoted herein simply cylinder. From a more functional perspective, the middle zone will essentially form a domain wherein the superficial velocity of the fluidization gas is essentially constant.

The middle zone typically contains most of the fluidized bed. While the bed also extends to the bottom and top zones, its major part is within the middle zone.

The fluidized bed typically has a fluidized bed density of from 150 to 350 kg/m$^3$, preferably from 180 to 320 kg/m$^3$. The fluidization velocity in the middle zone is then typically from 0.45 to 1.2 m/s, preferably from 0.50 to 1.1 m/s, such as from 0.55 to 0.95 m/s.

The middle zone has a ratio of the height over diameter (L/D) of at least about 4, preferably at least about 5. The height over diameter is typically not more than 15, preferably not more than 10.

The gas velocity within the middle zone is such that an effective circulation of solids is achieved. This leads to good heat and mass transfer within the bed, which reduce the risk of chunk formation and fouling. Especially, good powder flow near the walls of the reactor has been found to reduce the adhesion of polymer at the wall of the reactor.

The height L of the middle zone is the distance of the lowest point of the generally cylindrical part of the reactor to the highest point of the generally cylindrical part of the reactor. The lowest point of the generally cylindrical part is the lowest point above which the diameter of the reactor no longer increases with the height of the reactor but remains constant. The highest point of the generally cylindrical part is the lowest point above which the diameter of the reactor no longer remains constant with the height of the reactor but decreases. The diameter D of the middle zone is the (equivalent) diameter of the reactor within the generally cylindrical part.

The top zone of the reactor is shaped such that a gas-particle stream vicinal to the inner walls is created, whereby the gas-particle stream is directed downwards to the base. This gas-particle stream leads to an excellent particle-gas distribution and to an excellent heat and mass transfer. Further the high velocity of the gas and particles vicinal to the inner walls minimizes lump and sheet formation. The top zone has a generally conical, upwards tapering shape. It is further preferred that the ratio of the height of the top zone to the diameter of the middle zone is within the range of from 0.3 to 1.5, more preferably 0.5 to 1.2 and most preferably 0.7 to 1.1.

It is particularly preferred that the cone forming the top zone is a straight circular cone and the cylinder forming the middle zone preferably is a circular cylinder. More preferably the cone-angle of the cone-shaped top zone is 10° to 50°, most preferably 15 to 45°. As defined above, the cone-angle is the angle between the axis of the cone and the lateral area.

The specific cone-angles of the cone-shaped upper zone further improve the tendency for back-flow of the particles countercurrent to the fluidization gas. The resulting unique pressure balance leads to an intensive break up of bubbles, whereby the space-time-yield and solids concentration are further improved. Further as mentioned above, the wall flow velocity, i.e., the velocity of particles and gas vicinal to the inner walls is high enough to avoid the formation of lumps and sheets.

Polymer is withdrawn from the reactor. As it was discussed above, one part of the polymer may be withdrawn by using the cyclone installed in the circulation gas stream. However, the amount of polymer withdrawn therefrom is usually not sufficient for withdrawing the whole polymer production from the reactor. Therefore, it is preferred to withdraw polymer also from the reactor, especially preferably from the middle zone of the reactor.

The polymer is withdrawn from the middle zone in any manner known in the art, either intermittently or continuously. It is preferred to withdraw the polymer continuously because then the conditions in the reactor fluctuate less than with intermittent withdrawal. Both methods are well known in the art. Continuous withdrawal is disclosed, among others, in WO-A-00/29452, EP-A-2330135 and EP-A-2594433. Intermittent withdrawal is disclosed, among others, in U.S. Pat. No. 4,621,952, EP-A-188125, EP-A-250169 and EP-A-579426.

In a preferred continuous withdrawal method the polymer is withdrawn through an open pipe. In one preferred embodiment the pipe is equipped with a control valve whose position is automatically adjusted to maintain a desired outflow rate. The valve position may be set, for instance, by the reactor bed level controller. In another preferred embodiment the pipe discharges the polymer to a vessel, the pressure of which is controlled to maintain a desired pressure difference between the reactor and the vessel. The pressure difference then sets the polymer flow rate from the reactor to the vessel.

Catalyst, which is optionally dispersed within polymer particles, is introduced into the reactor, suitably into the fluidized bed. Any method known in the art may be used for introducing the catalyst. According to one method the catalyst, or the polymer containing the catalyst, is introduced in a stream of inert gas. According to another method the catalyst is introduced as slurry in a liquid diluent.

It is possible to introduce the catalyst, optionally dispersed within polymer particles, also into the bottom zone to the level where the base of the bed is formed or even below it. The fluidization gas then transports the particles into the fluidized bed. This is especially useful when the gas phase reactor is preceded by a prior polymerization stage. The catalyst is then dispersed within the polymer particles formed in the prior polymerization stage.

Withdrawal of Agglomerates

The agglomerates eventually present in the reactor may be withdrawn by using an agglomerate trap below the bottom zone and suitably below the base of the fluidized bed. After recovering the agglomerates may be disposed of or they may be crushed and mixed with the product.

When the agglomerates reach a certain size they no longer remain fluidised by the fluidisation gas but start falling downwards in the bed. When they are big enough they fall through the bottom zone to the agglomerate trap. The critical size depends on the fluidisation velocity, on one hand, and the density of the fluidised bed, on the other hand. Especially the density of the bed has a strong effect on the residence time of the agglomerates in the bed before they drop out of the bed. In the normal operation conditions as described above, for instance a bed density between 180 and 320 $kg/m^3$ and the fluidization velocity in the middle zone between 0.55 and 0.95 m/s, the residence time of the agglomerates in the bed is typically not more than 300 seconds and preferably not more than 180 seconds. Usually the agglomerate does not drop instantaneously through the bed but remains there at about 5 seconds, minimum.

The agglomerate trap typically comprises a cylinder which is isolated from the bottom zone and the downstream equipment, for instance, by two valves. The valves are operated in sequence to allow filling and emptying of the cylinder.

The content of agglomerates in the trap, or a process variable which indicates the content of the agglomerates, is measured. Such measurement may include the measurement of the density of the contents of the agglomerate trap, for instance by radioactive measurement.

Another option is to measure the temperature in the agglomerate trap. The polymer and polymer agglomerates still contain active catalyst and therefore they are heated by the heat of the polymerisation. The inventors have found that the temperature in the agglomerate trap may increase substantially when the trap contains agglomerates, for instance by at least 2.5° C., or by at least 3° C., such as from 4° C. to 30° C. or even more, or from 5° C. to 20° C., or even more. The advantage of the temperature measurement is that the measurement is not hazardous, it is cheap and easy to implement and the accuracy is good.

Instead of measuring the temperature in the agglomerate trap it is also possible to measure a temperature difference, for instance, between the temperature in the agglomerate trap and the bottom zone of the reactor, or the difference in the temperatures in the agglomerate trap during two different process steps.

The opening and closing of the isolation devices, such as valves, is suitably controlled by a sequence controller. According to one suitable mode of operation the connection to the bottom zone of the reactor is kept open. At a suitable point of time the connection is closed and discharging of the agglomerate trap to the downstream process is activated. When the discharge is completed then the connection to the bottom zone of the reactor is reopened.

According to one preferred embodiment the opening and closing of the valves may be controlled so that when the measurement indicates the presence of agglomerates in the agglomerate trap then the connection to the bottom zone is closed and the discharge is activated. When the discharge is completed the connection to the bottom zone is reopened.

According to another preferred embodiment the sequence controller, such as a programmable logic controller, keeps the connection to the bottom zone open for a predetermined period. After the lapse of the period the connection to the bottom zone is closed and the discharge activated. When the discharge is completed the connection to the bottom zone is reopened.

It is important that during the operation of the process the connection between the agglomerate trap and the bottom zone of the reactor, on one hand, and the discharge of the agglomerate trap, on the other hand, are not open simultaneously. If they were, they would allow the discharge of a large amount of gas from the reactor, resulting in unstable process.

It is possible to introduce pressurised gas via a separate line to the agglomerate trap for flushing the trap. The pressurised gas can be inert gas, such as nitrogen, or it may be the circulation gas from the circulation gas line which returns the fluidisation gas from the top of the reactor to the bottom thereof.

As the person skilled in the art understands, the agglomerate trap, including the connection lines and the valves, must be designed to allow the flow of the agglomerates from the bottom zone to the trap. Also it must be possible to discharge the agglomerates from the agglomerate trap. Typically the agglomerates have a size of from 3 to 10 mm, or even greater. The design should thus allow the removal of at least 10 mm objects. Suitably the minimum diameter of the pipes and equipment in the agglomerate trap is at least 50 mm, preferably at least 100 mm and more preferably at least 150 mm.

Post-Reactor Treatment

When the polymer has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

Benefits of the Invention

The agglomeration trap in the present invention is a separate entity equipped with two valves in order to get connected with the bottom zone of the reactor and with the agglomerates recovery system. Said configuration allows the detection of any type of agglomerates (i.e. big size spherical particles, sheets or chunks) that are accumulated in the agglomerate trap by measuring the relevant process variables. This feature allows the possibility to select or adjust the open/close times of the two valves in order to remove the agglomerates during the operation.

The present invention provides a smooth operation of the process. The agglomerates are removed from the reactor without disturbing the process and before they grow so large that they cause severe process upsets. Further, the downstream process is operated without problems. Further, the agglomerates do not reach a size which would make it impossible to remove them from the reactor without a shut-down.

DESCRIPTION OF THE DRAWINGS

FIG. 1 shows a reactor system according to the prior art. The reactor (1) has a bottom zone (5), a middle zone (6) and a top zone (7). The fluidization gas is introduced into the bottom zone (5) through the opening (8). While the gas flows upwards through the bottom zone (5) its superficial velocity reduces due to the increasing diameter. A fluidized bed starts to form within the bottom zone (5). The gas continues to travel upwards through the middle zone (6) where the gas velocity is constant and the bed is fully formed. Finally the gas reaches the top zone (7) from where it is withdrawn through the opening (9). The gas, together with entrained solids, passes along line (12) to a cyclone (2). The cyclone (2) removes most of the entrained solid from the circulation gas which is passed through the gas outlet (13) along the lines (16) and (18) to a compressor (17). Before the compressor (17) there is preferably a filter (4). In the compressor (17) the gas is pressurized and passed through line (19) to a cooler (3) where it is cooled. From the cooler (3) the gas is passed along the line (20) into the inlet (8) of the reactor (1).

The solid stream is passed from the cyclone (2) through the opening (14) to line (21). By using a valve (15) the solid stream may be either withdrawn and sent to further processing along line (23) or returned into the reactor (1) along line (22) through the opening (24).

The polymer is product is withdrawn from the reactor (1) along one or more outlets (11). Catalyst, optionally dispersed within polymer particles from a preceding polymerization stage, is introduced into the reactor (1) along line (10). Additional monomer, comonomer, hydrogen and inert gas may be introduced at a convenient location of the circulation gas line (16, 18, 19, 20).

Figure 2:
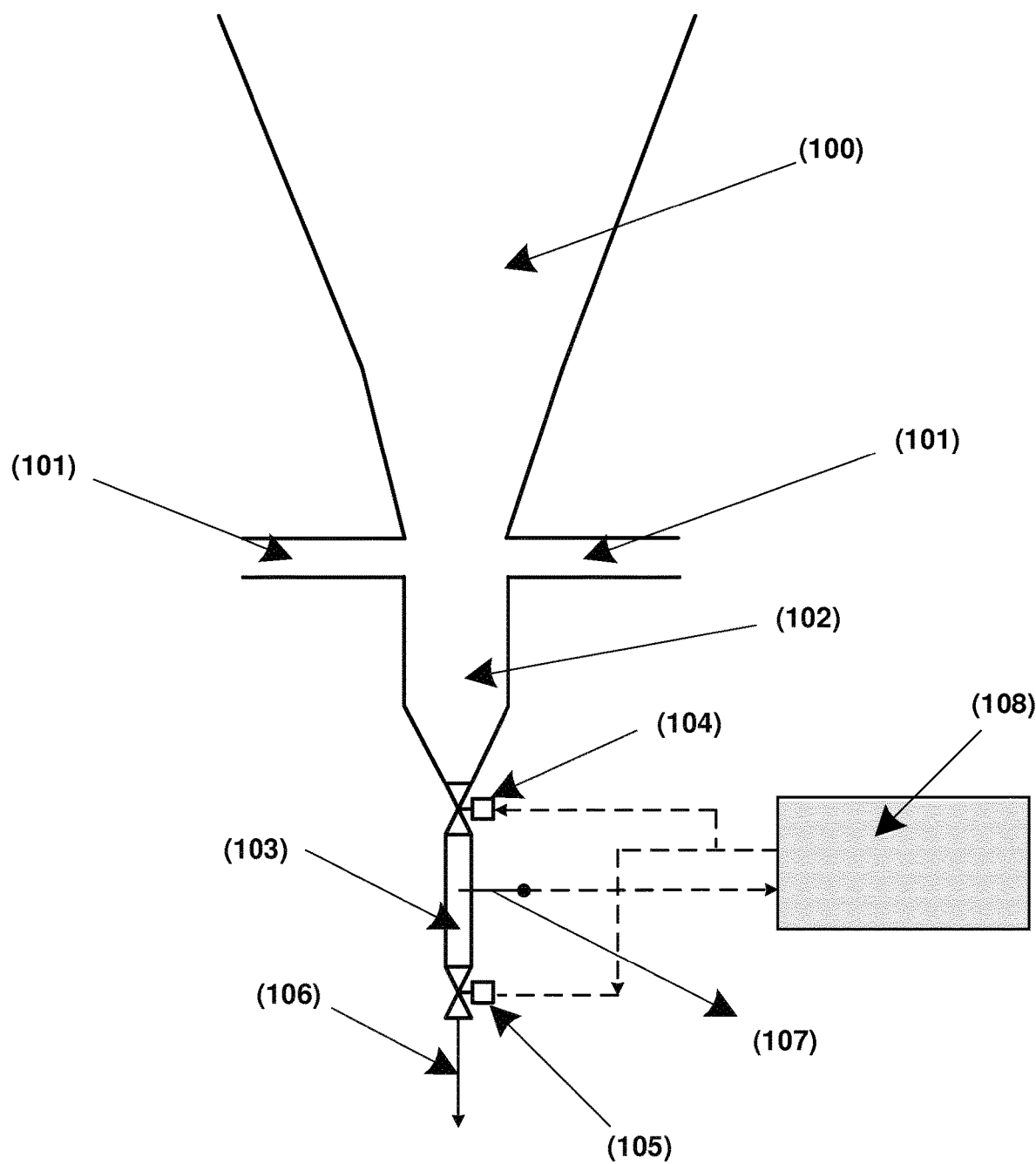
FIG. 2 is a schematic drawing illustrating the bottom part of the reactor used in the present invention.

FIG. 2 is a schematic drawing of the lower part of the polymerisation reactor according to the invention. The reactor includes a bottom zone (100) into which fluidisation gas is introduced via two pipes (101). Below the gas entry point there is a zone (102) containing fluidisation gas and into which polymer agglomerates may fall from the bottom zone (100). At the bottom of the zone (102) there is an upper valve (104) between the cylinder (103) and the zone (102). The cylinder (103) has a discharge valve (105) at the bottom. By opening the discharge valve (105) the contents of the cylinder (103) are discharged via line (106) into downstream process stages.

The cylinder (103) has a temperature probe (107) which measures the temperature within the cylinder (103). The temperature probe (107) sends a temperature measurement signal to the sequence controller (108). Based on the signal from the temperature measurement (107) the sequence controller (108) sends a signal to valves (104) and (105) which causes the valves to open or to close.

According to one embodiment the valve (104) is kept open for a period of t1 allowing gas and agglomerates to fall from the zone (102) of the reactor to the cylinder (103). After the lapse of the period t1 the valve (104) closes. When the valve (104) is fully closed the controller (108) opens the valve (105) thereby discharging the contents of the cylinder (103) into subsequent process stages via the line (106). After the lapse of a predetermined period t2 the controller (108) shuts the valve (105). When the valve (105) is shut the controller again opens the valve (104). Based on the measurement signal from the temperature probe (107) the controller (108) adjusts either one of t1 and t2 or both of them.

Figure 3:
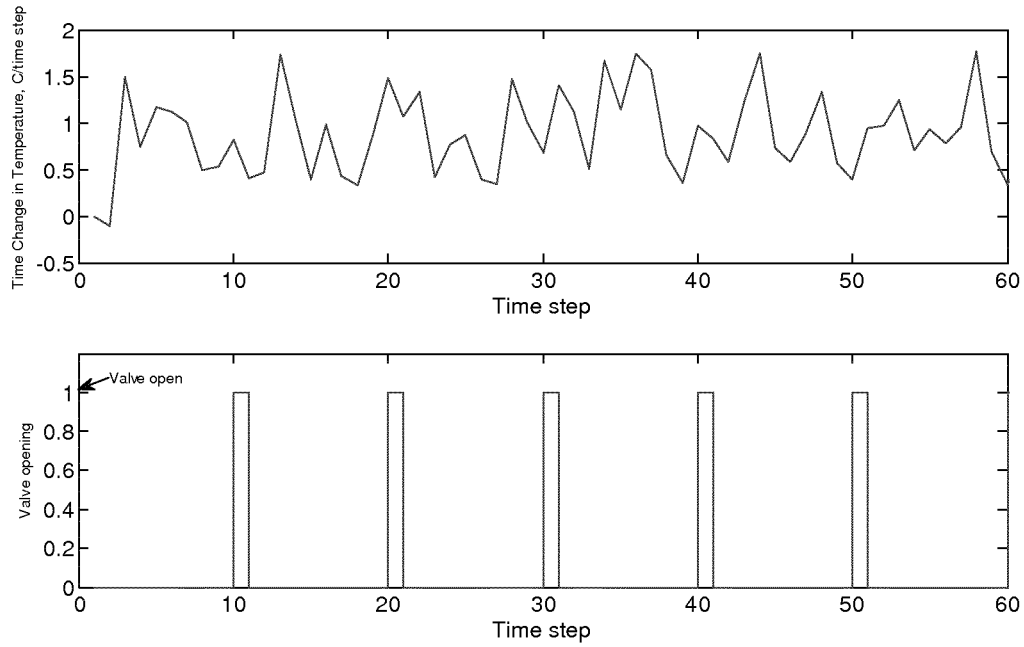
FIG. 3 is a drawing illustrating the temperature in the agglomerate trap and the operation of the outtake valve when there are no or very few agglomerates.
Figure 4:
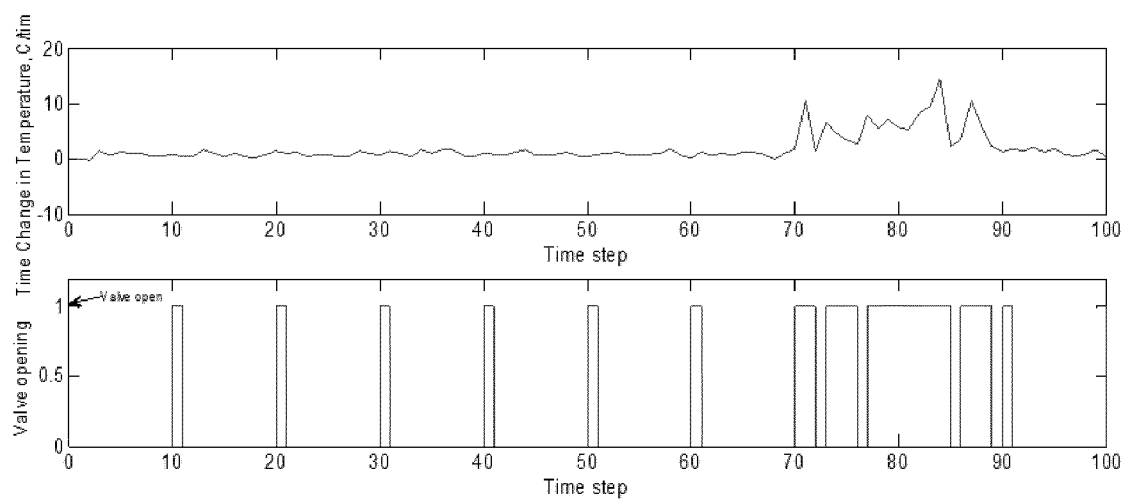
FIG. 4 is a drawing illustrating the temperature in the agglomerate trap and the operation of the outtake valve when agglomerates are present in the process.

FIGS. 3 and 4 show the temperature in the agglomerate trap and the opening status of the valve (105). The opening status 0 means a fully closed valve and 1 means a fully open valve. FIG. 3 shows normal operation where agglomerates are not formed or they are formed only in small amount. The temperature variation in the cylinder (103) is stochastic and the amplitude of the variation does not exceed the normal temperature variation within the process. The trap is discharged in regular interval. In the example of FIG. 3 the discharge valve (105) is opened every 10 time steps for a period of one time step.

FIG. 4 shows a situation where agglomerates are present. At the time step of about 70 the temperature in the cylinder (103) increases significantly, about 10° C. The controller (108) increases the pace of the cycle of opening and closing valves (104) and (105). Thereby the valves (104) and (105) are opened and closed five times during the period of 20 time steps, between 70 and 90. Furthermore, the discharge time during which the valve (105) is open is increased to facilitate the discharge of the agglomerates from the cylinder (103). At the time step of about 90 the temperature drops to normal and then also the discharge cycle of the cylinder (103) is returned to normal.

EXAMPLES

In Examples 1 and 2 the reactor was operated at an absolute pressure of 20 bars and a temperature of 85° C. Propane was used as the fluidization gas. The invention was exemplified with a reactor assembly having the following properties:
Height of the bottom zone: 900 mm
Height of the middle zone: 1500 mm
Height of the upper zone 415 mm
Diameter of the middle zone 300 mm Example 1

The reactor described above was used for copolymerization of ethylene and 1-butene at a temperature of 80° C. and a pressure of 20 bar. The height of the fluidized bed, calculated from the bottom of the middle zone was 2300 mm. Ethylene homopolymer (MFR2=300 g/10 min, density 974 kg/m$^3$) produced in a loop reactor and still containing active catalyst dispersed therein was introduced into the reactor via an inlet located in the bottom zone at a rate of 40 kg/h. Ethylene, hydrogen and 1-butene were continuously introduced into the circulation gas line so that the ethylene concentration in the fluidization gas was 15% by mole, the ratio of 1-butene to ethylene was 80 mol/kmol and the ratio of hydrogen to ethylene was 5 mol/kmol. The reminder of the fluidization gas was propane. The flow rate of the gas was adjusted so that the superficial gas velocity in the cylindrical part of the reactor was 70 cm/s. The flow rate of the gas at the inlet in the bottom zone was about 17 m/s.

The resulting copolymer could be easily withdrawn via an outlet at a rate of 80 kg/h. The temperature in the agglomerate trap below the bottom zone of the reactor was measured and the opening of the valves (104) and (105) (in FIG. 2) was adjusted based on the measurement. The temperature in the agglomerate trap (or in fact a temperature difference to a reference temperature; the reference temperature being the temperature in the agglomerate trap after the discharge) and the opening position of the valve (105) are shown in FIG. 3.

FIG. 3 shows the operation of the control algorithm when the reactor runs without difficulties/disturbances. As the figure shows, during the time period from 0 till 60 the change in chamber temperature is around ±3.0° C./time step. This low change in temperature results in normal operation of the outlet valve (105) (1 indicates a fully open valve). The valve opens every 10 time steps.

Example 2

The procedure of Example 1 was repeated. This time agglomerates are formed in the reactor and withdrawn through the trap. FIG. 4 illustrates the process.

This example shows the actions taken by the controller when there are lumps accumulated inside the chamber. When such materials accumulated, the temperature inside the chamber increases, consequently, leading to an increase in the rate of variation in chamber temperature as can be seen in the FIG. 4. Therefore, the controller opens the discharge valve for longer periods and repeats the cycle more frequently.

In this example the agglomerates could be removed from the reactor via the agglomerate trap after which the operation of the process became stable. The process could be then operated smoothly for a number of days until the campaign came to a scheduled end and the operation was terminated.

The invention claimed is:

1. A method for withdrawing polymer agglomerates from a fluidised bed polymerisation reactor, the polymerisation reactor comprising a middle zone having a generally cylindrical shape, a bottom zone having a generally conical shape in direct contact with and below the middle zone and wherein a base of a fluidised bed is formed, and wherein there is no fluidisation grid in the fluidised bed reactor and an agglomerate trap below the bottom zone, the agglomerate trap having a body, a first connection comprising a first valve connecting the body to the bottom zone and a second connection comprising a second valve connecting the body to agglomerate recovery system and wherein the reactor does not comprise a fluidisation grid, the method comprising the steps of measuring a value of a process variable indicative of the content of agglomerates in the agglomerate trap; and adjusting the opening time of the first valve or the second valve or both the first valve and the second valve based on the measured value.

2. A method according to claim 1 comprising the steps of (i) opening the first valve; (ii) keeping the first valve open for a first time period t1; (iii) closing the first valve; (iv) opening the second valve; and (v) closing the second valve; wherein the steps (i) to (v) are conducted in a repeated sequence, characterised in that the method comprises the additional step of (vi) adjusting the first time period t1 based on the measured value of the process variable indicative of the content of agglomerates in the agglomerate trap.

3. The method according to claim 2 wherein the first time period t1 is increased if the process variable indicative of the content of agglomerates in the agglomerate trap indicates that agglomerates are not present and/or the first time period t1 is decreased if the process variable indicative of the content of agglomerates in the agglomerate trap indicates that agglomerates are present in the agglomerate trap.

4. The method according to claim 1 wherein the second valve is kept open for a second time period t2.

5. The method according to claim 4 wherein the second time period t2 is increased if the process variable indicative of the content of agglomerates in the agglomerate trap indicates that agglomerates are present in the agglomerate trap and/or the second time period t2 is decreased if the process variable indicative of the content of agglomerates in the agglomerate trap indicates that agglomerates are not present.

6. The method according to claim 1 wherein the process variable indicative of the content of agglomerates in the agglomerate trap is based on measuring the temperature in the body of the agglomerate trap.

7. The method according to claim 6 wherein the first time period t1 is increased if the temperature in the body of the agglomerate trap decreases and/or the first time period t1 is decreased if the temperature increases.

8. The method according to claim 6 wherein the second time period t2 is increased if the temperature in the body of the agglomerate trap increases and/or the second time period t2 is decreased if the temperature decreases.

9. The method according to claim 6 comprising the step of measuring a temperature difference which is the difference between the temperature in the body of the agglomerate trap during the first time period t1 and the temperature in the body of the agglomerate trap during the second time period t2.

10. The method according to claim 9 wherein the first time period t1 is increased if the temperature difference decreases and/or the first time period t1 is decreased if the temperature difference increases.

11. The method according to claim 9 wherein the second time period t2 is increased if the temperature increases and/or the second time period t2 is decreased if the temperature difference decreases.

12. A system for withdrawing polymer agglomerates from a fluidised bed polymerisation reactor, the system comprising: (A) a polymerisation reactor comprising (A-1) a middle zone having a generally cylindrical shape, (A-2) a bottom zone having a generally conical shape in direct contact with and below the middle zone and wherein a base of a fluidised bed is formed, and (A-3) an agglomerate trap below the bottom zone, the agglomerate trap having a body, a first connection comprising a first valve connecting the body to the bottom zone and a second connection comprising a second valve connecting the body to agglomerate recovery system and wherein (A-4) the reactor does not comprise a fluidisation grid; (B) a sequence controller for controlling the sequence of opening and closing the first valve and the second valve; (C) means for determining the content of agglomerates in the body of the agglomerate trap and generating a signal proportional to the content of the agglomerates in the body of the agglomerate trap; and (D) a master controller for giving a set point to the sequence controller based on the signal proportional to the content of the agglomerates.

13. The system according to claim 12 wherein means for determining the content of and generating a signal proportional to the content of the agglomerates in the body of the agglomerate trap is a thermocouple.

\* \* \* \* \*